United States Patent Office 2,798,557
Patented July 9, 1957

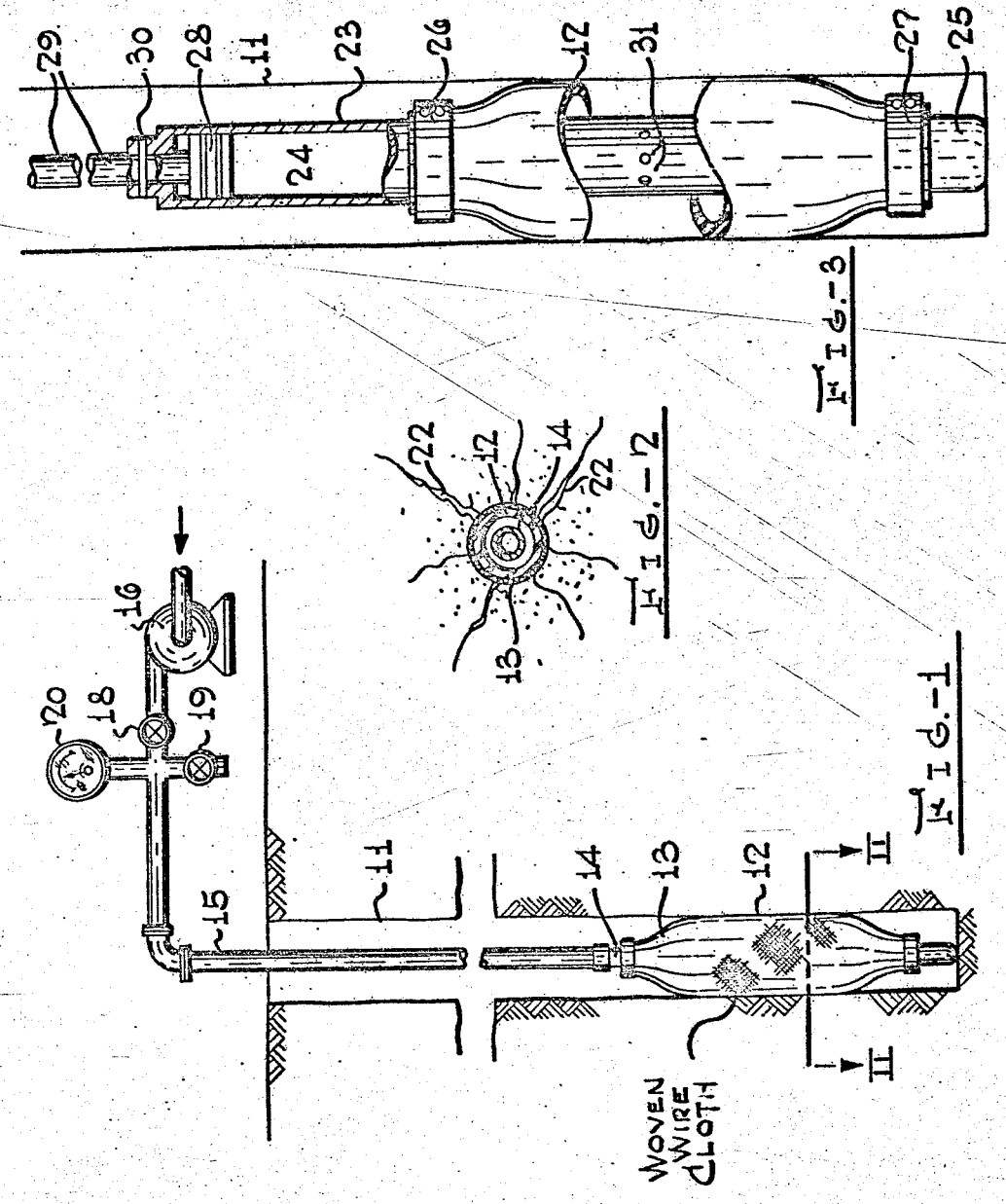

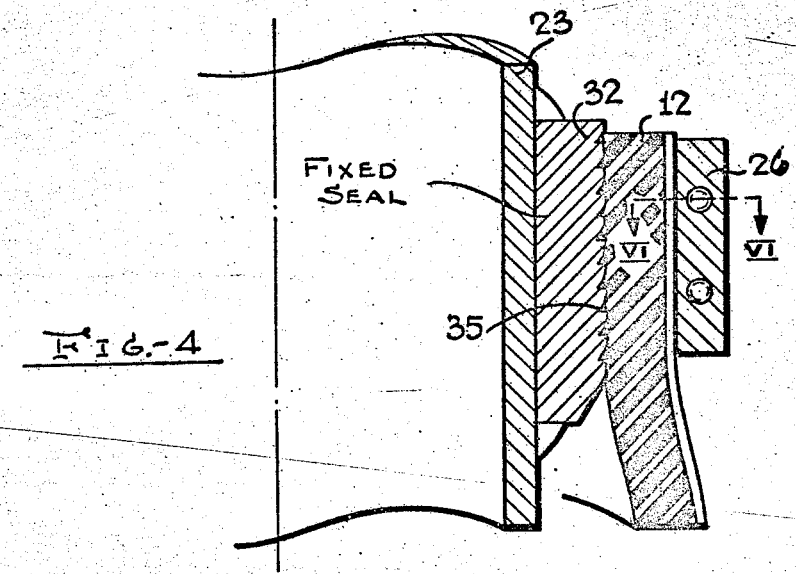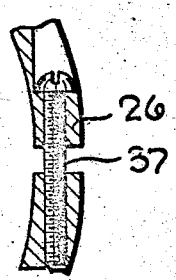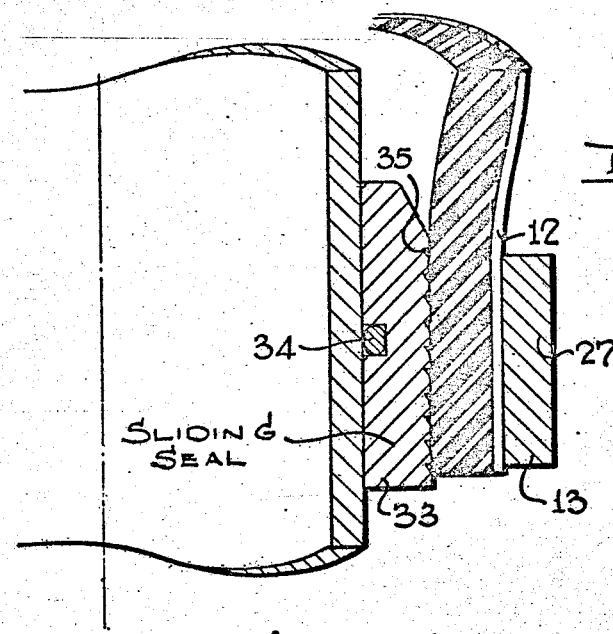

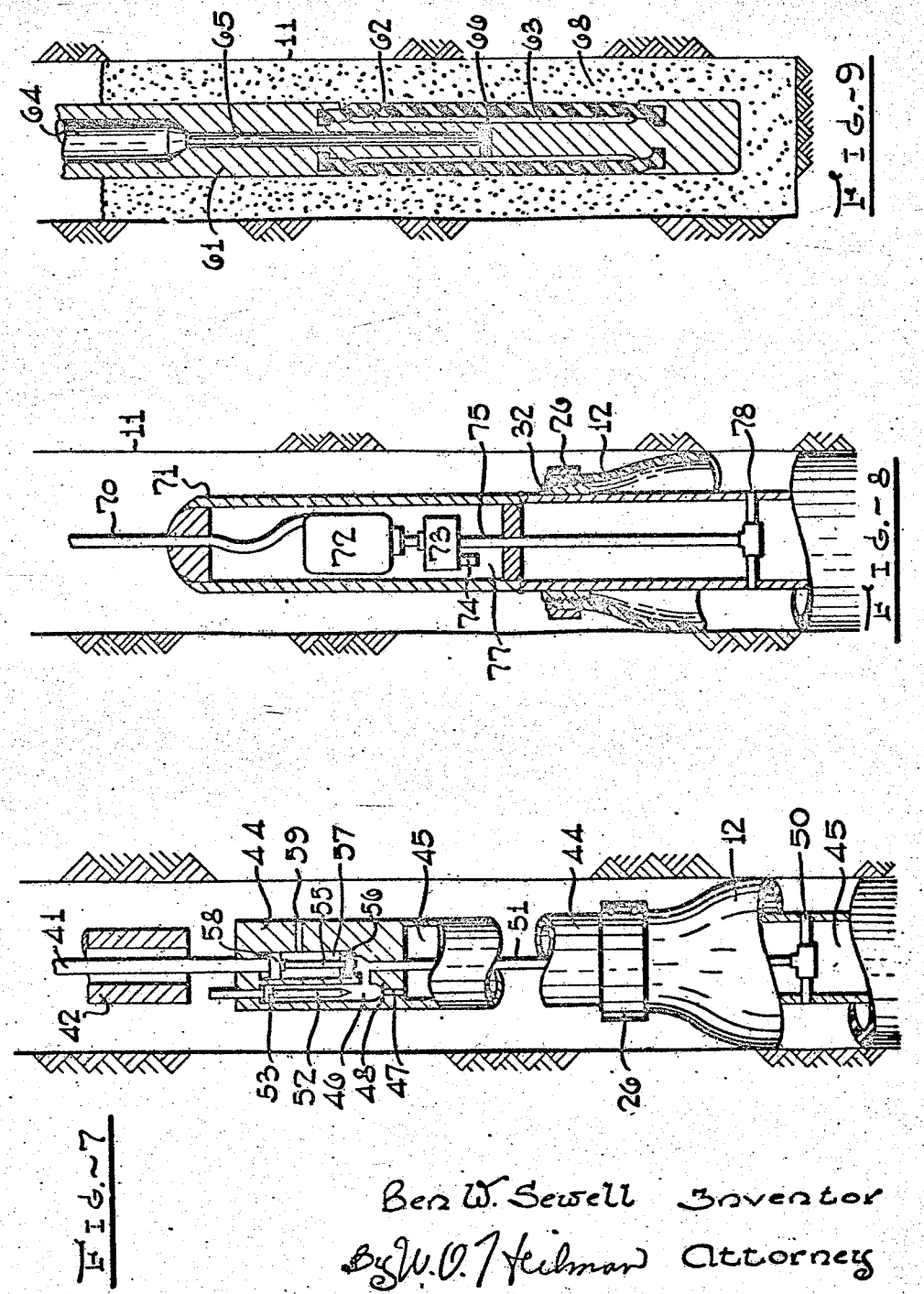

2,798,557

FRACTURING OIL BEARING FORMATIONS

Ben W. Sewell, Tulsa, Okla., assignor to Esso Research and Engineering Company, a corporation of Delaware Application May 16, 1952, Serial No. 288,095

2 Claims. (Cl. 166—42)

This invention relates to a method and apparatus for increasing the productivity of oil from subterranean formations containing the same. More specifically it relates to the fracturing of formations in the vicinity of a bore hole or producing well to thereby facilitate the release of oil into the well.

The rate at which a given reservoir can produce oil into a well bore is controlled to a large extent by the permeability of the formation and the pressure in the reservoir. Logs and cores from a newly discovered field may indicate a large oil accumulation, but if the permeability is too low, the reservoir may not be a commercial one. In other instances a well in a formation having moderately low permeability may be completed as a good producer, but after the well has produced for some time the pressure near the well bore may decline until production at a commercial rate is no longer possible. When either of these two conditions is encountered, a means of stimulating the production of the well must be found or else it will have to be abandoned. Most stimulating techniques are designed to increase the permeability in that part of the producing formation which is near the well bore.

It has long been recognized that the productivity of an oil bearing formation can be increased by creating artificial fractures adjacent the producing well. This has been accomplished in the past by the use of explosives and more recently by the application of high pressures transmitted through a viscous liquid such as hydrocarbon oil gel which is pumped into the producing well in sufficient volume and under sufficient pressure to rupture the formation. These gels are prepared by mixing a napalm soap (mixture of aluminum soaps of naphthenic, oleic and palmitic acids) with kerosene or crude oil and after a gel of sufficient viscosity has been produced coarse sand is added to the mixture. The gel and sand mixture is pumped down the well and into the productive formation at high pressure until a fracture of the formation results, which is usually indicated by a momentary drop in pump pressure. The gel then carries the sand into the fracture and when the gel is later broken down by a suitable degelling material it flows out of the fracture and leaves the sand in place to prop open the artificially formed fractures or flow channels.

This method of creating artificial fractures has several disadvantages. Since all oil or gas producing formations must have some permeability, the viscous fluid used is lost, to varying degrees, into the formation when pressure is applied. Therefore, the fluid must be pumped at a sufficiently high rate to exceed this loss and build up the relatively high pressure required for fracture. Not only does this require a lot of heavy surface equipment but there is danger of damaging the formations, with respect to oil productivity, by the fluid that is forced into the pores of the formation. The method has the further disadvantage that once a fracture occurs fluid loss becomes so great that further rupturing cannot be accomplished.

It is an object of the present invention to provide a method and apparatus for fracturing a formation without the attendant loss of fluid and without danger of impairing the productivity of the formation. In accordance with this invention an elastic sleeve surrounded by a woven metal sheath is placed in the bore hole and hydraulic pressure is applied within the rubber tube. This expands the unit in the bore hole and fractures the formation. In a preferred embodiment of the invention the unit is made sufficiently smaller than the bore hole to define an annulus into which is placed granular or massive packing material which will serve as a pressure transfer medium, thus obviating the use of the woven metal sheath. In this embodiment, granular packing material, when of the proper size, will tend to be forced into the fractures formed and prevent the latter from closing when pressure is released.

The nature and objects of the invention will be more readily appreciated when consideration is taken of the disclosures in the accompanying drawing, in which:

Fig. 1 is a schematic diagram showing one embodiment of the invention in place in a bore hole, together with surface equipment to supply pressure to the hydraulic rupturing tube or sleeve;

Fig. 2 is a fragmental sectional view taken on line II—II of Figure 1;

Fig. 3 is an elevational view, partly in section, of an embodiment of the invention utilizing the weight of the drill pipe to force fluid within the elastic tube to rupture the formation;

Fig. 4 is an enlarged sectional detail of a portion of Fig. 3 showing means for fixing the tube or sleeve to the mandrel;

Fig. 5 is an enlarged sectional detail similar to Fig. 4 and showing means for slidably holding the lower end of the sleeve on the mandrel;

Fig. 6 is a rotated sectional view on line VI—VI of Fig. 4 showing a portion of the split ring used for holding the sleeve on the mandrel;

Fig. 7 is an elevational view partly in section showing an embodiment of the invention utilizing a pre-charged gas chamber for applying pressure within the elastic sleeve;

Fig. 8 is an elevational view in section showing an embodiment utilizing a reversible electric motor and a fluid chamber for applying pressure within the elastic tube; and Fig. 9 is an elevational sectional view showing an embodiment in which the rupturing sleeve is surrounded with granular fill material in the bore hole.

Referring now specifically to Fig. 1 one form of apparatus is shown in position in a bore hole 11, the apparatus comprising an elastic sleeve or hollow tube 12 surrounded by a woven metal sheath 13, the sleeve and sheath being fastened to a supporting member 14 which in turn is attached to pipe 15 which extends through the bore hole to the surface. Fluid is pumped through pipe 15 into the sleeve by means of a pump 16. The pressure of the fluid can be followed by means of gage 20 and when the pressure is to be released valve 19 may be opened. Valve 18 may be employed to hold the pressure built up by the pump and may advantageously comprise a check valve.

In Fig. 2, which is a fragmentary sectional view taken on line II—II of Fig. 1, is shown the result obtained by exerting pressure on the walls of the bore hole, a number of fractures 22 being formed through which increased production of oil may be obtained.

Instead of supplying pressure from the surface, it is also possible to employ the weight of the drill pipe to furnish the desired pressure for expanding the sleeve against the walls of the bore hole. One suitable apparatus for this purpose is shown in sectional elevational detail in Fig. 3. The sleeve 12 is supported on a mandrel 23 that terminates in a lower nose portion 25. Mandrel 23 has an inner chamber 24 within which a piston 28 is slidably fitted, the piston being connected to a tube or rod 29 which in turn may be connected to a drill pipe or drill collar. Thus when the apparatus is fastened to a drill pipe and set on the bottom of the bore hole the weight of the drill pipe may be exerted to drive piston 28 downward to force liquid from chamber 24 into sleeve 12 through ports 31 and thus expand the sleeve against the bore hole walls to fracture the formation in the same manner as with the embodiment of Fig. 1. A shear pin 30 may be used to prevent motion of the piston 28 until the bottom of the bore hole is reached. Sleeve 12 is fastened to mandrel 23 by means of rings 26 and 27. Preferably ring 27 is arranged for slidable movement along mandrel 23 to compensate for the slight shortening in the length of sleeve 12 as it expands.

The manner in which sleeve 12 is fastened to mandrel 23 is shown in detail in Fig. 4 and Fig. 5, Fig. 4 showing a fixed seal and Fig. 5 a sliding seal. Fixed seal spacer 32 is fastened to mandrel 23 and is provided with upwardly facing teeth 35 into which the fabric-reinforced elastic sleeve 12 is pressed by means of split ring 26. The arrangement in Fig. 5 is similar except that a sliding seal spacer 33 is provided which may slide along mandrel 23, one or more O-ring seals 34 being provided in suitable grooves in spacer 33 to prevent leakage of fluid past the spacer.

As shown in Fig. 6 sufficient pressure to hold sleeve 12 in place is obtained by means of the split rings 26 which may be tightened by means of bolts 37.

Instead of hydraulic pressure, gas pressure may also be employed for expanding the fracture tube or sleeve. One embodiment of this phase of the invention is shown in Fig. 7. The sleeve 12 is fastened to a cylinder 44 by means of split rings 26 and 27 in the same manner as in Fig. 3 and the cylinder is supported in the bore hole by a cable 41. Cylinder 44 has an inner pressure chamber 45 containing a gas under pressure, the gas being held within the chamber by means of a rupture disc 48. When it is desired to release gas from the chamber to inflate the tube the rupture disc is broken by means of a plunger 52 arranged within plunger chamber 46 and held in place by plug 53. Thus after the apparatus is lowered to the bore hole on cable 41 a bumper sleeve 42 surrounding cable 41 may be dropped down the bore hole to strike the top of plunger 52 and drive it against disc 48, thereby rupturing the same and permitting gas to escape from chamber 45 through conduit 47 into chamber 46 and thence into inflation tube 51 which terminates in ports 50 which communicate with the interior of tube 12.

When it is desired to deflate the fracture sleeve this may be done by exerting a sharp pull on cable 41 which will cause rod 55 to rupture deflation disc 56, permitting the gas to escape into inflation chamber 57 and out through port 59. The upward travel of rod 55 and cable 41 within the deflation chamber is limited by member 58.

Another embodiment wherein power for applying pressure to the fracture tube or sleeve is contained within the apparatus itself is depicted in Fig. 8 wherein the body 71 contains a reversible electric motor 72 that drives a pump 73 to draw oil or other pressure fluid from sump 77 through intake port 74 and force it within the fracture sleeve through conduit 75 and ports 78, the sleeve 12 being supported on the body 71 by the seal arrangement shown in Figs. 4 and 5. When the pressure is to be released the motor is reversed and the fluid is pumped back into the sump. Current for the motor is supplied through cable 70 which also supports the body within the bore hole.

As mentioned previously, it is preferred that the rupture unit be made sufficiently smaller than the bore hole to define an annulus into which granular or massive packing material or fill is placed so that this material may serve as a pressure transfer medium for the fracture sleeve. This enables greater pressures to be applied to the formation without rupturing the fracture sleeve. One form of apparatus that may be employed for this embodiment of the invention is shown in Fig. 9, the tube or sleeve 62 being supported on body 61 and the apparatus forming with the bore hole an annulus 68 into which granular material such as sand, fine gravel, small metal pellets or the like may be placed. Alternatively, massive fill material may be used, such as cement or plastic, such material being introduced into the bore hole around the sleeve in fluid form, and permitted to set up before the pressure is applied. Still another alternative is to employ a combination of granular material around the sleeve and a cap of cement above the granular material to confine the latter for more effective pressure transfer.

With the fill material in place, the sleeve is expanded by forcing fluid from chamber 64 through conduit 65 and ports 66 into annular space 63. The pressure will be transferred through the fill material to the walls of the bore hole to rupture the formation in the same manner as with the other embodiments of the invention. When a massive fill such as cement is used the latter will also fracture when the pressure is applied, thus freeing the tool to enable its removal, after which the cement may be drilled out. When granular material such as sand is used some of the granular material will be forced into the fractures that are produced. It is to be understood that any of the other structural embodiments of the invention may also be employed with the granular or massive fill material in the manner shown in Fig. 9.

The scope of this invention is to be limited only by the appended claims and is not confined to the particular embodiments herein described by way of example.

What is claimed is:

1. A method of fracturing a subterranean oil-bearing formation from a well bore penetrating the formation so as to improve its oil productivity, which comprises placing an expansible hollow elastic tube in the well bore adjacent the formation in a manner defining an annulus between the tube and the formation, filling said annulus with granular packing material, exerting sufficient fluid pressure within said tube to force said packing material against said formation and to fracture the formation in the vicinity of the well bore, continuing the exertion of fluid pressure within the elastic tube to force at least a portion of the packing material into the resulting fractures, thereafter releasing the fluid pressure on the elastic tube.

2. A method as defined in claim 1 in which the granular packing material is sand.

References Cited in the file of this patent

UNITED STATES PATENTS

| | | |
|---|---|---|
| 701,173 | Doyle | May 27, 1902 |
| 1,630,470 | Clifford | May 31, 1927 |
| 2,211,243 | Meyer | Aug. 13, 1940 |
| 2,296,947 | Pierce | Sept. 29, 1942 |
| 2,547,778 | Reistle | Apr. 3, 1951 |
| 2,596,844 | Clark | May 13, 1952 |
| 2,634,113 | Joy | Apr. 7, 1953 |
| 2,686,047 | Duncan | Aug. 10, 1954 |
| 2,687,179 | Dismukes | Aug. 24, 1954 |